United States Patent
Sandford

[11] Patent Number: 6,042,309
[45] Date of Patent: *Mar. 28, 2000

[54] TOOL BIT WITH UNDERCUT HOOK RADIUS

[75] Inventor: William E. Sandford, Camino, Calif.

[73] Assignee: Tri Tool Inc., Rancho Cordova, Calif.

[*] Notice: This patent is subject to a terminal disclaimer.

[21] Appl. No.: 09/244,886

[22] Filed: Feb. 5, 1999

Related U.S. Application Data

[63] Continuation of application No. 08/923,921, Sep. 5, 1997, Pat. No. 5,868,531.

[51] Int. Cl.$^7$ ................................................. B23B 27/22
[52] U.S. Cl. ........................ 407/114; 407/115; 407/116; 407/120
[58] Field of Search ............................ 407/114, 113, 407/115, 116, 120, 11, 100

[56] References Cited

U.S. PATENT DOCUMENTS

| | | |
|---|---|---|
| 1,945,535 | 2/1934 | Schlitz . |
| 3,381,349 | 5/1968 | Newcomer . |
| 3,792,514 | 2/1974 | Ushijima . |
| 3,947,937 | 4/1976 | Hertel . |
| 4,060,880 | 12/1977 | Nowak . |
| 4,159,885 | 7/1979 | Schott ..................................... 407/114 |
| 4,606,679 | 8/1986 | Jeremias . |
| 4,754,789 | 7/1988 | Jonsson . |
| 4,844,643 | 7/1989 | Icks . |
| 4,993,892 | 2/1991 | Takahashi . |
| 5,049,009 | 9/1991 | Beck et al. . |
| 5,222,843 | 6/1993 | Katbi et al. . |
| 5,302,060 | 4/1994 | Nystrom et al. ..................... 407/114 C |
| 5,454,670 | 10/1995 | Noda et al. . |
| 5,868,531 | 2/1999 | Sandford ............................... 407/114 |

FOREIGN PATENT DOCUMENTS

| | | | |
|---|---|---|---|
| 2357180 | 5/1975 | Germany ............................... 407/114 |

*Primary Examiner*—Henry W. H. Tsai
*Attorney, Agent, or Firm*—Bacon & Thomas, PLLC

[57] ABSTRACT

A tool bit for a tube end squaring tool includes a cutting edge produced by machining or grinding a hook radius in the tool bit stock on the entrance angle side of the cutting edge and an undercut portion within the hook radius just rearwardly of the cutting edge on the work entrance side thereof to cause separation from the hook radius area of metal chips parted from a metal workpiece by the cutting edge to reduce friction and workpiece metal buildup on or adjacent the cutting edge. The undercut configuration reduces manufacturing costs of the tool bit which otherwise would require additional finishing operations to obtain the same reduction of friction at the cutting edge area.

3 Claims, 2 Drawing Sheets

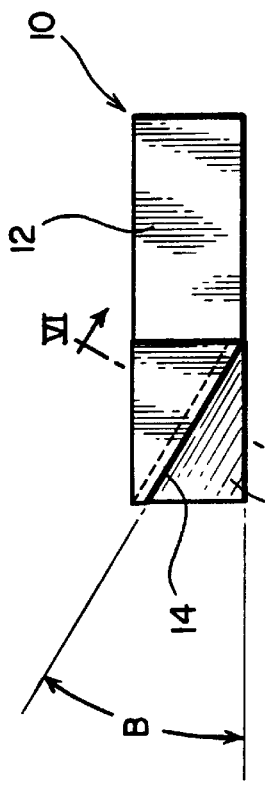
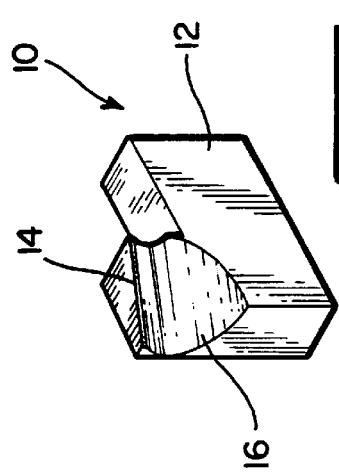
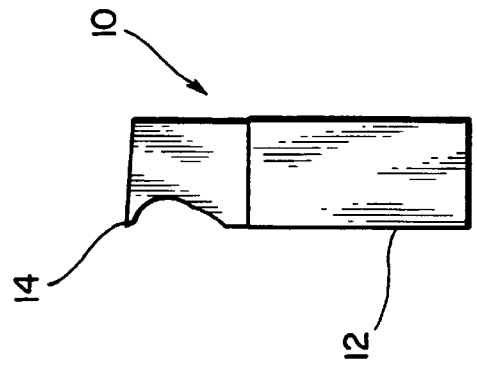
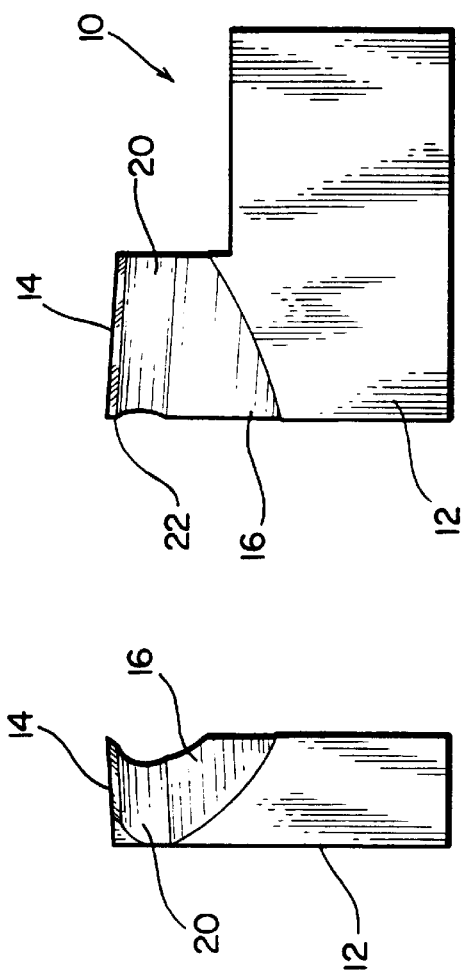

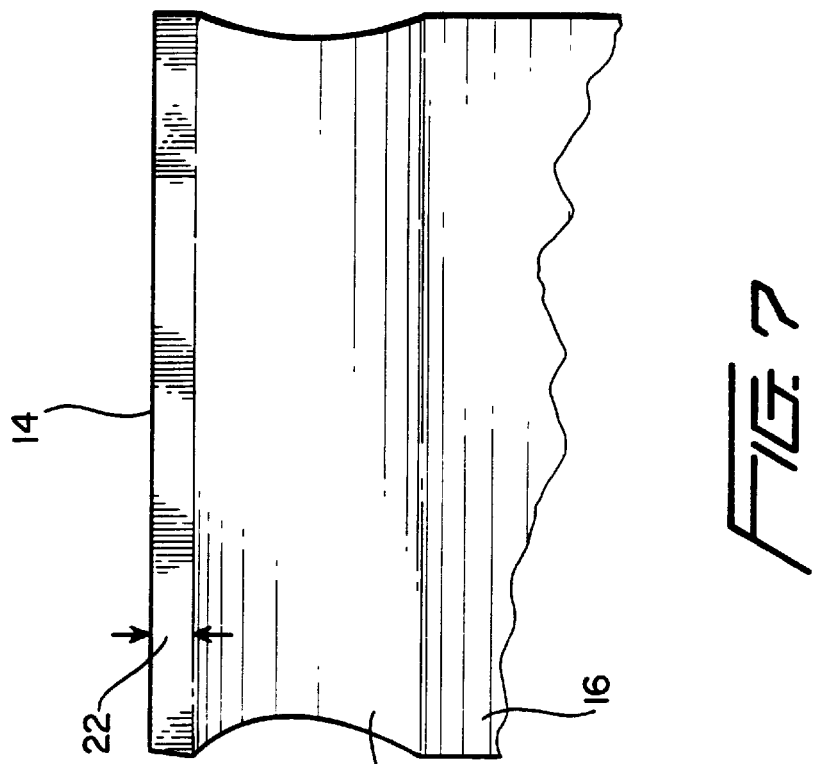
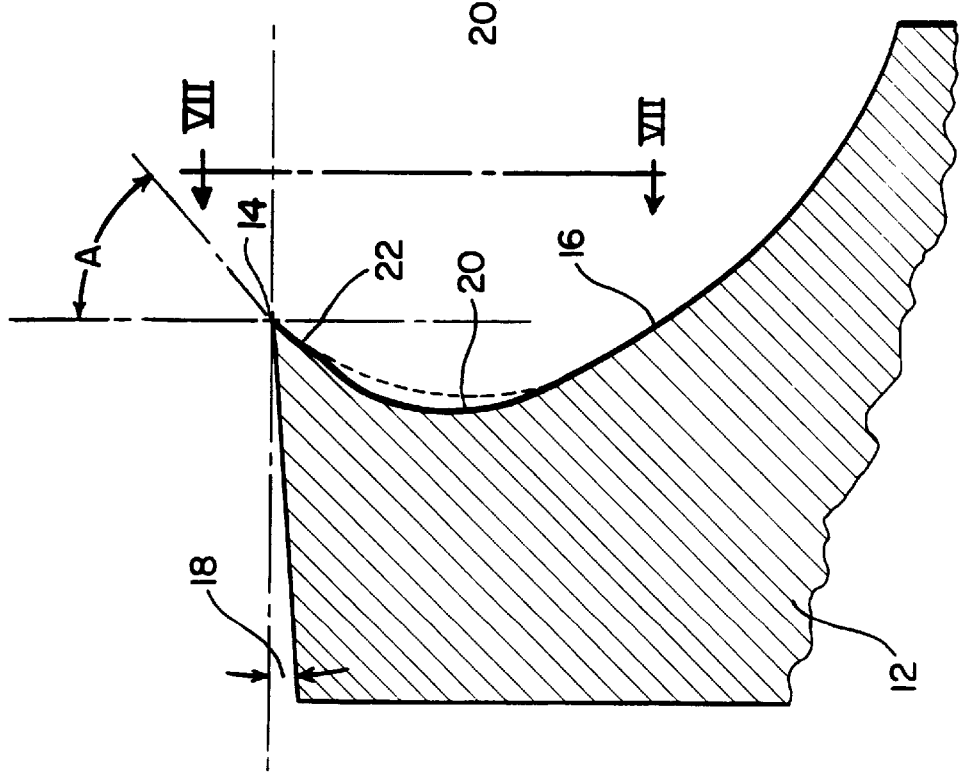

TOOL BIT WITH UNDERCUT HOOK RADIUS

CROSS REFERENCE TO RELATED APPLICATION

This application is a continuation of application Ser. No. 08/923,921 filed Sep. 5, 1997, now U.S. Pat. No. 5,868,531, issued Feb. 9, 1999.

BACKGROUND OF THE INVENTION

1. Field of the Invention

This invention is a tool bit intended for use in a metal cutting tool, in particular a tube end squaring tool.

2. Related Art

A typical tool bit useful in a tube end squaring tool such as described in U.S. Pat. No. 4,319,503 granted Mar. 16, 1982, includes a main body portion shaped by machining to present a cutting edge to a metal workpiece with an appropriate relief angle behind the cutting edge and a "hook radius" cut into the forward area of the cutting edge to present an entrance angle against which a chip separated from a metal workpiece flows during a cutting operation. A tool bit of this type is illustrated in the aforesaid U.S. Pat. No. 4,319,503.

Tool bits of this type are used for tube end squaring tools to machine the ends of tubes and pipes so they are square with the longitudinal axis of the tubular element and have a smooth and preferably burr-free surface at the end of the tubular element to prepare the element for a welding operation.

To achieve a smooth machined surface free of burrs, it has been found to be highly desirable to avoid heating the metal at the cutting zone to a minimum while promoting free flow of the cut metal chip away from the cutting edge of the tool bit. In accordance with prior art techniques, promotion of free chip flow includes polishing the hook radius leading away from the cutting edge and otherwise forming the hook radius area by machining procedures that maintain as smooth a surface as possible in the entrance angle area of the cutting edge of the tool bit. It is also conventional to provide a relatively high entrance angle for the cutting edge to keep burrs to a minimum, particularly if the metal being cut is relatively soft. Tool bits that are formed by grinding machinery are typically formed so that the grind lines run generally parallel to the cutting edge, and then another finishing operation is required to generate grind lines perpendicular to the cutting edge or to otherwise improve the finish of the entrance angle side of the cutting edge to reduce resistance to chip flow away from the cutting edge during a machining operation.

The various manufacturing and finishing operations required to produce an effective tool bit useful for a tube end squaring tool involves increased manufacturing and handling steps that in turn result in higher costs associated with manufacturing such tool bits. It would be highly desirable to reduce the manufacturing costs for such tool bits, the pricing of which is highly competitive in view of the expendable nature of the tool bits.

Specifically, it would be highly desirable if the entrance angle side of the cutting edge did not need to be highly polished or precision ground with the grind lines running perpendicular to the cutting edge, all of which contributes to the higher manufacturing costs of a tool bit useful for facing or squaring the ends of tubular workpieces.

Tool bits constructed in accordance with the prior art also exhibit "built-up-edge-cutting" (BUE cutting), which entails virtual welding of metal workpiece material to the cutting edge of the tool bit as cutting progresses, which reduces cutting efficiency, and, in the extreme, results in formation of a rough cutting edge comprising workpiece metal welded to tool bit stock. BUE cutting also may result in cyclic buildup of workpiece metal on the cutting edge and periodic sloughing off of the workpiece metal during machining, which also produces an irregular and burred surface.

BRIEF SUMMARY OF THE INVENTION

In accordance with the present invention, the hook radius area of the tool bit is undercut slightly to provide a relief section just behind the cutting edge on the entrance side thereof to thereby cause separation of a metal chip being cut by the tool bit from the hook radius surface during operation of the tool bit. The undercut eliminates the need for polishing the entrance angle side of the cutting edge to a high degree and also avoids the need to produce the cutting edge with grind lines running perpendicular to the cutting edge. By achieving reduction of friction between the metal chip and the entrance side of the cutting edge in the hook radius area, a smooth, burr-free cutting edge is obtained while the manufacturing cost of the tool bit is reduced as compared with a polished tool bit.

A better understanding of the invention will be obtained with reference to the following detailed description and the appended drawings.

BRIEF DESCRIPTION OF THE DRAWINGS

With regard to the appended drawings:

FIG. 1 is a perspective view taken from a left upper end of a tool bit embodying the invention;

FIG. 2 is a top plan view thereof;

FIG. 3 is a left end view thereof;

FIG. 4 is a front elevation view thereof;

FIG. 5 is a right end elevation view thereof;

FIG. 6 is an enlarged cross-section view taken along line VI—VI in FIG. 2; and

FIG. 7 is a view taken along line VII—VII of FIG. 6.

DETAILED DESCRIPTION OF THE PREFERRED EMBODIMENTS OF THE INVENTION

With reference to the drawings, a tool bit includes a body portion 12 and a cutting edge 14 formed by machining or grinding away a portion of the body stock material in a "hook radius" area 16 that is not precisely a circular curve, but rather is a parabolic curve produced by cove cutting using a rotary grinding wheel, the plane of rotation of which is angled at an acute angle relative to the advancing direction of the grinding wheel through the tool bit stock material. For convenience, this curvature is referred to conventionally as a "hook radius" and it will be understood throughout this description and the claims that the use of the term hook radius simply refers to a curvature of the tool bit stock or body leading up to the cutting edge 14 to establish a cutting edge angle A as shown in FIG. 6.

As shown in more detail in FIG. 6, a relief angle 18 is also typically provided behind the cutting edge of the tool bit in accordance with well-known tool bit design principles.

In accordance with the present invention, an undercut 20 is machined in the hook radius 16 just rearward of the cutting edge 14 so as to leave an entrance angle width 22 of the hook radius 16 rearward of the cutting edge 14.

Preferably, a width of approximately 0.020 in. (0.5 mm) has been found to perform effectively in a tool bit used for a tube end squaring tool.

The depth of the undercut is not critical, and, by way of example, may be formed by undercutting the hook radius area using a grinding or forming tool producing a circular undercut having a radius of 0.265 in. (6.7 mm) and a depth of 0.010–0.015 in. (0.25–0.38 mm). The entrance angle A in a tool bit of the type illustrated typically is on the order of 38°. The approach angle B of the cutting edge 14, as illustrated in FIG. 2, typically is 30° for a tool bit of the type illustrated.

The shape and form of the undercut 20 and its depth may be varied to suit specific tool bit cutting entrance angles and hook radius curvatures, tool bit operating conditions, as well as the metallurgy of the workpiece to be cut. The undercut 20 with the remaining uninterrupted entrance angle hook radius material 22 results in a cutting edge 14 having a very short entrance angle ramp provided by the hook radius material 22 followed by an undercut zone 20 that results in separation of the metal chip being cut from the hook radius section of the tool bit at the undercut zone to thereby reduce friction between the chip and the tool bit immediately after formation of the chip. This reduces chip friction and BUE cutting by reducing heat in the cutting zone, all of which produces a smooth, burr-free surface on the machined workpiece.

It will be understood that the invention may be utilized with tool bits having other shapes all without departing from the spirit and scope of the invention as defined in the claims that follow.

I claim:

1. A tool bit comprising:

a tool bit body;

a cutting edge having a work entrance side formed in the body;

a concave continuously curved profile defining a hook radius area formed in the body leading away from the cutting edge on the work entrance side thereof;

an undercut in the body extending parallel and coextensive with the cutting edge formed in the hook radius area and terminating at a predetermined distance from the cutting edge to leave a portion of the hook radius area of predetermined width extending along the cutting edge on the work entrance side thereof and a hook radius area portion on a side of the undercut opposite the side on which the work entrance side of the cutting edge is located.

2. The tool bit as claimed in claim 1, wherein said predetermined width is approximately 0.02 in (0.5 mm).

3. The tool bit as claimed in claim 1, wherein said undercut has a curved cross-section profile.

* * * * *